(12) United States Patent
Ziebart et al.

(10) Patent No.: US 12,202,610 B2
(45) Date of Patent: Jan. 21, 2025

(54) ICE PROTECTION SYSTEM FOR AN AIRCRAFT

(71) Applicant: THE BOEING COMPANY, Chicago, IL (US)

(72) Inventors: John Alexander Ziebart, Renton, WA (US); Douglas James Silva, Auburn, WA (US); Hosam E. El-Gabalawy, Bothell, WA (US); Luis Antonio Laracuente-Colon, Kenmore, WA (US); Camron Ravell Call, St. Charles, MO (US)

(73) Assignee: THE BOEING COMPANY, Arlington, VA (US)

( * ) Notice: Subject to any disclaimer, the term of this patent is extended or adjusted under 35 U.S.C. 154(b) by 335 days.

(21) Appl. No.: 17/646,060

(22) Filed: Dec. 27, 2021

(65) Prior Publication Data
US 2023/0202660 A1     Jun. 29, 2023

(51) Int. Cl.
B64D 15/12     (2006.01)
B64D 15/20     (2006.01)

(52) U.S. Cl.
CPC ............. *B64D 15/12* (2013.01); *B64D 15/20* (2013.01)

(58) Field of Classification Search
CPC ................................ B64D 15/12; B64D 15/20
See application file for complete search history.

(56) References Cited

U.S. PATENT DOCUMENTS

| | | | | |
|---|---|---|---|---|
| 7,439,877 B1 * | 10/2008 | Jarvinen | ................ | B64D 15/20 340/581 |
| 8,517,601 B2 * | 8/2013 | Stothers | ................ | B64D 15/20 374/45 |
| 8,602,359 B2 * | 12/2013 | Stothers | ................ | B64D 15/12 244/134 D |
| 9,676,485 B2 | 6/2017 | Stothers et al. | | |
| 9,914,543 B2 * | 3/2018 | Meis | ................... | B64D 15/166 |
| 10,018,580 B2 * | 7/2018 | Stothers | ................ | G01N 25/72 |
| 10,071,808 B1 * | 9/2018 | Bosetti | ................... | B64D 15/20 |

(Continued)

FOREIGN PATENT DOCUMENTS

CN          105329445 A          2/2016

OTHER PUBLICATIONS

Extended European Search Report for Application No. 22216679.5 dated May 11, 2023, pp. 1-8.

*Primary Examiner* — Joshua J Michener
*Assistant Examiner* — Michael B. Kreiner
(74) *Attorney, Agent, or Firm* — Moore IP Law (57) ABSTRACT

An ice protection system for an aircraft includes one or more heaters configured to be coupled to a surface of a wing of the aircraft. The ice protection system also includes a controller configured to, in response to a first determination indicating presence of an icing condition, determine a setpoint temperature for a first location of an outer surface of the wing configured to be heated by a heater of the one or more heaters. The controller is also configured to control power provided to the heater based on the setpoint temperature. The setpoint temperature for the first location is determined to cause a second location of the outer surface of the wing, which is heated by the heater and is located at a particular distance from the first location, to remain above a threshold temperature based on a projected temperature profile of the outer surface heated by the heater.

20 Claims, 6 Drawing Sheets

(56) References Cited

U.S. PATENT DOCUMENTS

| | | | |
|---|---|---|---|
| 10,442,539 B2 | 10/2019 | Froman | |
| 11,034,457 B2* | 6/2021 | Borup | B64D 15/12 |
| 11,299,280 B2* | 4/2022 | Burton | B64D 15/04 |
| 11,414,196 B2* | 8/2022 | Burton | B64D 15/12 |
| 11,618,575 B2* | 4/2023 | Botura | H05B 3/146 |
| | | | 244/134 C |
| 2008/0111028 A1 | 5/2008 | Kumar et al. | |
| 2022/0411079 A1* | 12/2022 | Stothers | B64D 15/20 |
| 2023/0066407 A1* | 3/2023 | Botura | G01M 5/0091 |

\* cited by examiner

ICE PROTECTION SYSTEM FOR AN AIRCRAFT

FIELD OF THE DISCLOSURE

The present disclosure is generally related to an ice protection system for an aircraft to inhibit unacceptable icing of aircraft wings, engine cowls, or both, during icing conditions.

BACKGROUND

Many aircraft include an ice protection system to limit icing of particular portions of the aircraft (e.g., particular slats of aircraft wings and engine cowls). Ice protection systems allow for operation of the aircraft in conditions where icing may occur. As one example, a bleed-air ice protection system may direct heated air produced by the engines to particular surfaces to reduce icing. As another example, an electrical ice protection system uses electrical heaters to heat particular aircraft surfaces to reduce icing. It can be challenging for a bleed-air ice protection system to maintain a specified level of ice protection at high altitudes. Further, electrical ice protection systems provide a particular amount of power to heaters when an icing condition is detected even if the amount of power is excessive for the vast majority of icing conditions encountered by the aircraft, which can cause overheating of particular aircraft surfaces if the electrical ice protection system is designed for more severe icing conditions than the conditions in which the aircraft is operating.

SUMMARY

In a particular implementation, an ice protection system for an aircraft includes one or more heaters configured to be coupled to a surface of a wing of the aircraft. The ice protection system also includes a controller configured to, in response to a first determination indicating presence of an icing condition, determine a setpoint temperature for a first location of an outer surface of the wing configured to be heated by a heater of the one or more heaters. The controller is also configured to control power provided to the heater based on the setpoint temperature. The setpoint temperature for the first location is determined to cause a second location of the outer surface of the wing, which is heated by the heater and is located at a particular distance from the first location, to remain above a threshold temperature based on a projected temperature profile of the outer surface heated by the heater. In particular implementations, the setpoint temperature for the first location also ensures that runback ice thickness remains within allowable limits based on the projected temperature profile of the outer surface heated by the heater.

In another particular implementation, a controller for an ice protection system of an aircraft includes a processor and a memory coupled to the processor. The memory includes instructions executable by the processor. The instructions are executable by the processor to receive data regarding conditions associated with the aircraft from a plurality of sensors. In response to a determination based on the data indicating an icing condition, the instructions are executable by the processor to determine a setpoint temperature for a first location of an outer surface of a slat of a wing of the aircraft. The first location is heated by a heater coupled to the slat. The instructions are executable by the processor to control power provided to the heater based on the setpoint temperature. The setpoint temperature for the first location is determined to cause a second location of the surface of the outer surface of the slat, which is heated by the heater and is located at a particular distance from the first location, to remain above a threshold temperature based on a projected temperature profile of the outer surface.

In another particular implementation, a method of preventing unacceptable icing during flight of an aircraft includes receiving, at a controller, data regarding conditions associated with the aircraft from a plurality of sensors. The plurality of sensors include first sensors configured to provide first data regarding flight conditions, one or more second sensors configured to provide second data regarding icing conditions, and third sensors configured to provide third data regarding temperatures associated with particular locations of outer surfaces of slats heated by a plurality of heaters. In response to a determination based on the second data indicating an icing condition, the method includes determining, at the controller based on the first data and the second data, a level of ice protection to be provided and determining, at the controller based on the data, temperature profiles for outside surfaces of the slats heated by the plurality of heaters to provide the level of ice protection. In response to the determination based on the second data indicating the icing condition, the method also includes causing, via the controller, supply of power to the plurality of heaters based on the temperature profiles to heat the outer surfaces of the slats.

The features, functions, and advantages described herein can be achieved independently in various implementations or may be combined in yet other implementations, further details of which can be found with reference to the following description and drawings. The drawings are conceptual and not drawn to scale.

DETAILED DESCRIPTION

An aircraft includes an ice protection system that uses electrical heaters to heat outer surfaces of portions of the aircraft that are to receive ice protection. Current ice protection systems are designed to apply power to the electrical heaters that is sufficient to overcome a most severe icing condition that the aircraft can encounter when the ice protection system is engaged. Instead of designing the ice protection to operate to overcome the most severe icing condition, the ice protection system of the present disclosure uses a controller, so that the ice protection system addresses the actual icing condition instead of the most severe icing condition. Having an ice protection system that addresses the actual icing conditions can reduce power demand during most flights, while still allowing the ice protection system to accommodate the most severe icing condition should such condition be encountered. The aircraft can use smaller, lighter electrical generators sized to accommodate typical icing conditions encountered during flights. When harsher icing conditions than typical icing conditions are encountered during a flight, control systems of the aircraft cause power supplied to one or more secondary systems to be reduced or stopped so that sufficient power is available for the ice protection system. The ability to use smaller, lighter electrical generators improves the fuel efficiency of the aircraft due to the lower weight of the smaller, lighter electrical generators, due to less power extraction from the engines to drive the smaller, lighter electrical generators, or both, as compared to the use of larger electrical generators needed for ice protection systems that function to overcome the most severe icing conditions when engaged. The ability to control the power applied to the heaters can extend the use life of the electrical heaters as compared to an aircraft with an icing protection system that is designed to overcome the most severe icing condition when engaged. The ability to provide ice protection at a lower surface temperature than for an ice protection system that is designed to overcome the most severe icing condition when engaged may enable a reduction of structural gauge thickness for wiring, which further reduces weight of the aircraft and improves fuel efficiency of the aircraft.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features referred to herein as a group or a type are referenced (e.g., when no particular one of the features is being referenced), the reference number is used without a distinguishing letter. However, when one particular feature of multiple features of the same type is referred to herein, the reference number is used with the distinguishing letter. For example, referring to FIG. 2, heater zones 204A-C are shown. When referring to a particular one of these heater zones, such as the heater zone 204C, the distinguishing letter "C" is used. However, when referring to any arbitrary one of these heater zones or to these heater zones as a group, the reference number 204 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority, order, or arrangement of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

Figure 1:
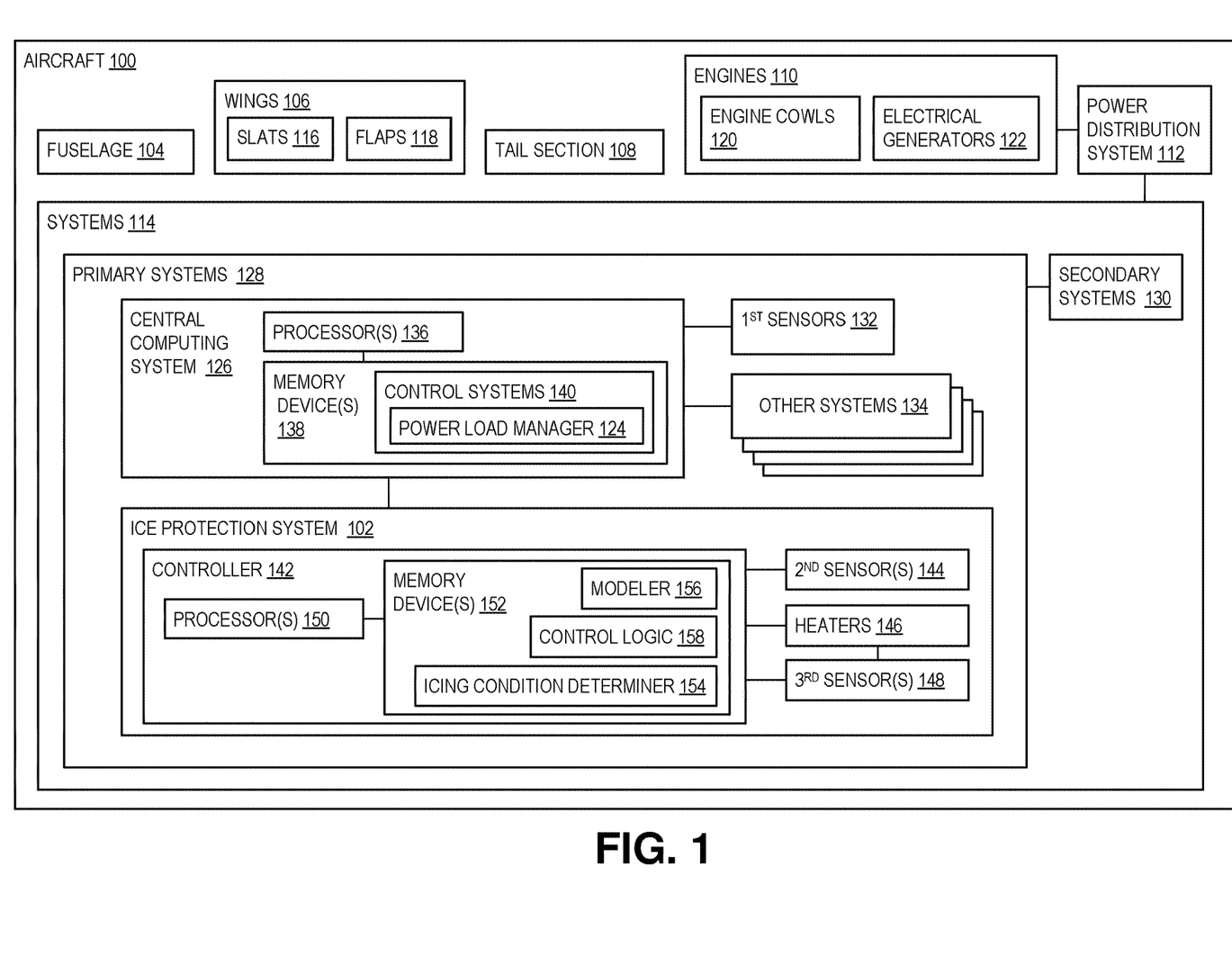
FIG. 1 is a block diagram of an aircraft that includes an ice protection system to inhibit unacceptable icing of aircraft wings, engine cowls, or both.

FIG. 1 is a block diagram of an aircraft 100 with an ice protection system 102. The aircraft 100 includes a fuselage 104, wings 106, a tail section 108, engines 110, a power distribution system 112, and systems 114. The wings 106 and the tail section 108 are coupled to the fuselage 104. The wings 106 have airfoil shapes and include slats 116 on leading edges of the wings 106, flaps 118 coupled to trailing edges of the wings 106, or both. The slats 116, flaps 118, or both, can be used during a flight to adjust flight characteristics of the aircraft 100. For example, the slats 116 can be extended during one or more phases of a flight to increase a coefficient of lift of the aircraft 100 and the slats 116 can be retracted during other phases of the flight to reduce drag.

The engines 110 are coupled to the fuselage 104, to the wings 106, to the tail section 108, or combinations thereof, to provide thrust to the aircraft 100. The engines 110 include engine cowls 120. One or more of the engines 110 include electrical generators 122 that generate electricity. The electricity is provided to the power distribution system 112.

The power distribution system 112 converts the electricity received from the electrical generators 122 into electricity usable by components of the systems 114 of the aircraft 100. For example, the power distribution system 112 converts a first portion of the electricity received from the electrical generators 122 into 3-phase alternating current (AC) electricity associated with a first voltage and a second portion of the electricity received from the electrical generators 122 into direct current (DC) electricity associated with a second voltage. The AC electricity and the DC electricity are usable by equipment and instrumentation of the systems 114. The power distribution system 112 distributes electricity to the systems 114 based on signals sent from a power load manager 124 of a central computing system 126 to the power distribution system 112, to controllers of the systems 114, or both.

The systems 114 include primary systems 128 and secondary systems 130. The primary systems 128 are systems needed for safe operation of the aircraft 100 (e.g., navigation control systems, flight instrumentation, landing gear systems, fuselage air control systems, communication systems, etc.). The secondary systems 130 are systems that are not needed for safe operation of the aircraft 100 (e.g., hot food and beverage systems, ice machines, video entertainment systems, etc.).

The primary systems 128 include the central computing system 126, first sensors 132, the ice protection system 102, and other systems 134 needed for safe operation of the aircraft 100. The central computing system 126 controls operation of the aircraft 100. The central computing system 126 includes one or more processors 136 and one or more memory devices 138 coupled to the one or more processors 136. The one or more memory devices 138 store instructions executable by the one or more processors 136 to perform operations. The instructions include control systems 140 to control various systems of the aircraft 100 (e.g., a navigation system, engine operation, a landing gear system, fuselage air pressure and temperature control systems, etc.).

In an implementation, the control systems 140 include the power load manager 124. The central computing system 126 receives data regarding the amount of available power from the power distribution system 112 and electrical usage data for one or more of the systems 114. The power load manager 124 determines a power load required by the systems 114. When the power load exceeds specified power criteria (e.g., a threshold percentage of the available power), the power load manager 124 sends signals based on the electrical usage data to the power distribution system 112, to controllers for one or more of the systems 114, or both, to limit an amount of power available for use by one or more of the systems 114 from the power distribution system 112. If the power load determined by the power load manager 124 does not satisfy the specified power criteria (e.g., exceeds a threshold), the power load manager 124 can send signals to reduce or suspend operation of one or more of the secondary systems 130 to ensure that the power distribution system 112 is able to supply power to the primary systems 128.

For example, during a flight, the aircraft 100 can encounter an icing condition that, without the use of counter measures, would allow an unacceptable amount of ice to form on the slats 116, the engine cowls 120, or both. Unchecked formation of ice can cause reduced maneuverability and reduced flight efficiency due to added weight and changes in airflow due to accumulation of ice. Unchecked formation of ice can also present a danger to the aircraft via loss of lift due to changes in airflow around the wing and loss of thrust from engine ice ingestion causing damage to the engine. During icing conditions, the ice protection system 102 heats surfaces of the slats 116, engine cowls 120, or both to prevent unacceptable ice formation. Unacceptable ice formation can include any accumulation of ice on one or more first portions of surfaces protected by the ice protection system 102, presence of ice over a threshold thickness on one or more second portions of the surfaces protected by the ice protection system, or both. An amount of icing that is considered to be unacceptable is based at least in part on a particular phase of a flight. Allowable amounts of ice accumulation are determined during aircraft design and the allowable amounts of ice accumulation may vary with respect to altitude, flight phase, ambient temperature, and flap/slat deployment.

For typical icing conditions, the power load determined by the power load manager 124, which includes the power load due to the use of the ice protection system 102, is not enough to violate the specified power criteria. But if the icing conditions are severe (e.g., the water content of the outside air is high), the power load determined by the power load manager 124, which includes the power load due to the use of the ice protection system 102, can violate the specified power criteria (e.g., by exceeding the threshold percentage). Exceeding the threshold percentage can result in the power load manager 124 sending signals to the power distribution system 112, to controllers of one or more of the secondary systems 130, or both, that cause suspension or reduction of power available to one or more of the secondary systems 130, so that sufficient power is available to operate the ice protection system 102.

The primary systems 128 include the first sensors 132. The first sensors 132 provide first sensor data to the central computing system 126 regarding flight conditions that enable determination of flight condition values for the aircraft 100. The flight condition values include aircraft speed indicator (e.g., Mach number), outside air temperature, altitude, angle of attack, flight phase (e.g., ascent, cruise, or descent), status of the slats 116 (e.g., retracted or extended), deflection angle of the flaps 118, other values, or combinations thereof.

The primary systems 128 include the ice protection system 102. The ice protection system 102 includes a controller 142, one or more second sensors 144, heaters 146, and third sensors 148. The controller 142 includes one or more processors 150 coupled to one or more memory devices 152. The one or more memory devices 152 store instructions that are executable by the one or more processors 150 to perform operations. The instructions include an icing condition determiner 154 to determine if the aircraft 100 is experiencing an icing condition, a modeler 156 to determine temperature profile models of outer surfaces of the aircraft 100 heated by the heaters 146 when the aircraft 100 is experiencing the icing condition, and a control logic 158 to adjust power supplied to the heaters 146 to inhibit unacceptable icing of particular surfaces of the aircraft 100. The outer surfaces of the aircraft 100 heated by the heaters 146 are surfaces of the wings 106 or engine cowls 120 that can be subjected to direct airflow contact during flight of the aircraft 100.

The one or more second sensors 144 provide icing condition data to the controller 142. The icing condition data enables the controller 142 to determine if the aircraft is experiencing an icing condition and allows for a determination of the water content of the outside air.

In an implementation, the second sensors 144 provide power information from an ice detection system to the controller 142. The ice detection system includes a first heater to heat a first area of the outside surface of the aircraft to a first setpoint temperature below the freezing point of water (e.g., a setpoint temperature of −3 degrees Centigrade or some other temperature below zero Centigrade) and a second heater to heat a second area of the outside surface of the aircraft to a second setpoint temperature above the freezing point of water (e.g., a setpoint temperature of 3 degrees Centigrade or some other temperature above zero Centigrade). The power information includes first power needed to maintain the first setpoint temperature and second power needed to maintain the second setpoint temperature. In an icing condition, the second power is significantly greater than the first power. Such an icing detector is described in U.S. Pat. No. 8,517,601, the content of which is incorporated herein by reference. Values for the first power and the second power are used by the controller 142 to determine a value for the water content of the outside air.

In other implementations, an ice detector uses a probe to detect incoming water droplets; and once a threshold is reached, the ice detector sends a signal to the controller 142 to indicate that an icing condition is present.

The heaters 146 are coupled to the slats 116, to inlet portions of the engine cowls 120, to other surfaces that are to be heated to prevent or control ice formation, or combinations thereof. The heaters 146 are electro-thermal (e.g., resistance) heaters that are conformed, or are conformable, to portions of the aircraft 100 to be heated to prevent unacceptable icing.

In some implementations, the heaters 146 are line replaceable units in the form of heater mats that are thermally coupled to inner surfaces of particular slats 116 or to inner surfaces of particular engine cowls 120 so that heat provided by the heaters 146 heats outer surfaces of the particular slats 116 or the particular engine cowls 120 to prevent unacceptable icing. Inner surfaces of the slats 116, engine cowls, or other portions of the aircraft heated by heaters 146 are surfaces that are not subject to direct airflow contact during flight of the aircraft. In some implementations, one or more of the heaters 146 include multiple heater zones, and each heater zone is separately controllable by the controller 142 to provide a particular amount of heat to a surface in thermal contact with the heater zone. In other implementations, instead of having heaters 146 with multiple heater zones, multiple single heater zone heaters, or a combination of multiple heater zone heaters and single heater zone heaters are used to heat particular surfaces of the aircraft 100. In a particular implementation, the heaters 146 may include or correspond to heaters that are available from GKN Aerospace Services Limited (United Kingdom), or from other manufacturers.

Figure 2:
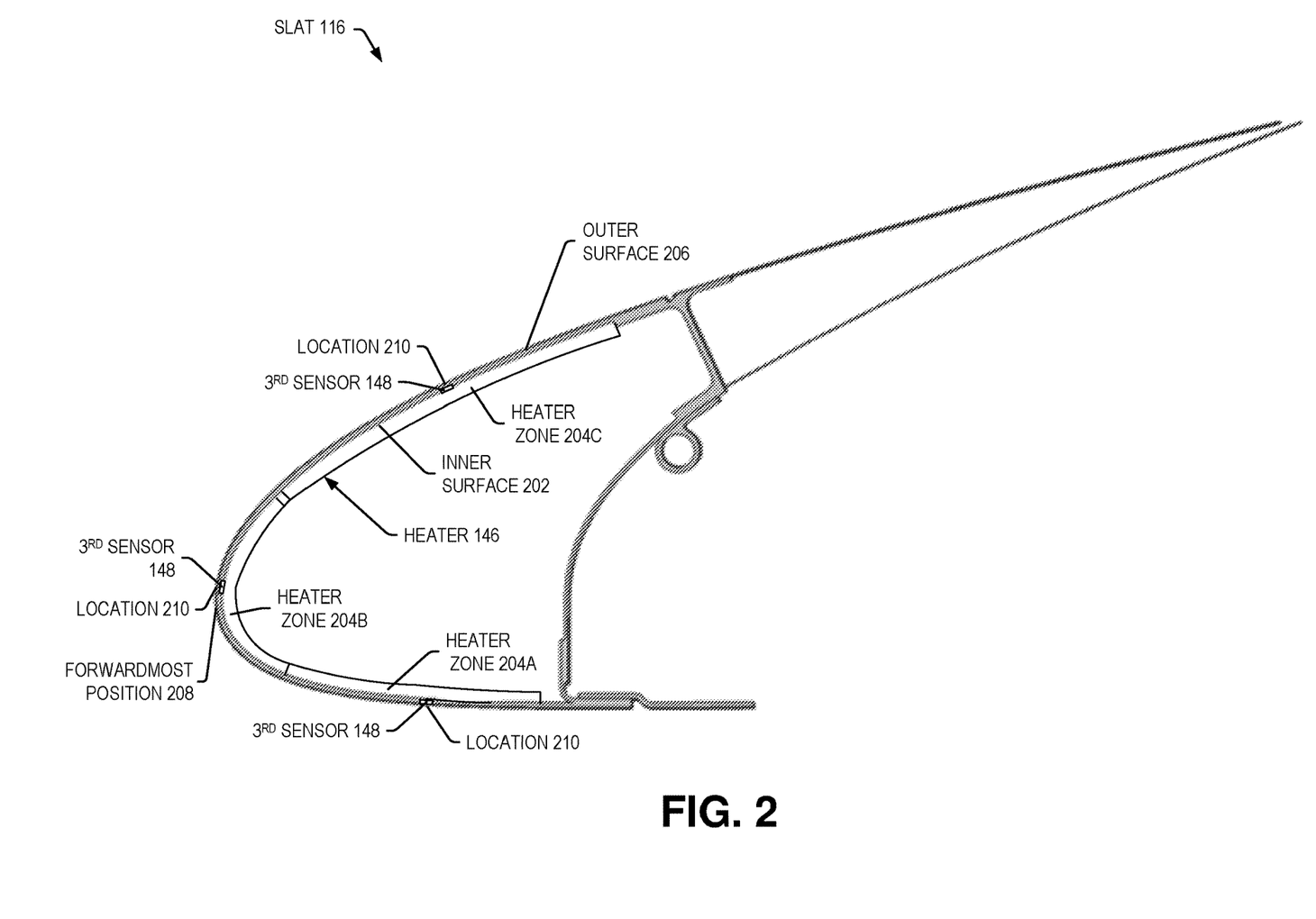
FIG. 2 is a cross-sectional representation of a slat of a wing of an aircraft with a heater coupled to an inner surface of the slat.

FIG. 2 depicts a cross-sectional representation of a slat 116 with a heater 146 coupled to an inner surface 202 of the slat 116. The slat 116 is coupled to or defines a portion of a leading edge of a wing 106. The heater 146 has a length and a width. The length of the heater 146 is positioned along a spanwise portion of the slat 116. The width of the heater 146 is divided into three heater zones 204A-C that are positioned on a chordwise span of the slat 116. The width is conformed, or conformable, to a shape of the inner surface 202 of the slat 116 so that a first heater zone 204A is thermally coupled to a lower portion of the inner surface 202, a second zone 204B is thermally coupled to a middle portion of the inner surface 202, and a third heater zone 204B is thermally coupled to an upper portion of the inner surface 202. Each heater zone 204A-C can have a different width and an amount of power supplied to the heater zones 204A-C to generate heat is separately controllable by the control logic 158 of the controller 142. In other implementations of heaters 146 for the aircraft 100, the heaters 146 include fewer than three heater zones 204A-C or more than three heater zones 204A-C.

The third sensors 148 provide the controller 142 with temperature data associated with temperatures at locations 210 of outer surfaces 206 of the slats 116, outer surfaces of engine cowls 120, or both, heated by the heaters 146. A third sensor 148 is associated with each heater zone 204 of a heater 146 at a location 210. In an implementation, the third sensor 148 associated with a heater zone 204 is located at a middle of an area heated by the heater zone 204. In other implementations, the third sensor 148 can be located at a different location than the middle location of the area heated by the heater zone 204. FIG. 2 depicts third sensors 148 located at middles of the areas heated by the heater zones 204A, 204B, 204C. More than one third sensor 148 can be associated with each heater zone in some implementations, but more than one third sensor 148 may unnecessarily add additional weight to the aircraft 100 and increase a complexity of calculations performed by the controller 142 to model thermal profiles of surfaces heated by the heaters 146.

In some implementations, the third sensors 148 are thermally coupled to, or embedded in, the slat 116 or engine cowl 120. Icing wind tunnel testing has shown that third sensors 148 which are thermally coupled to, or embedded in, the slats 116 heated by the heaters 146 provide more reliable data than third sensors 148 that are thermally coupled to, or embedded in, the heaters 146. If the inner surface 202 of a slat 116 heated by a heating element of a heater zone 204 and the heating element were in perfect thermal contact, and a thickness of the slat 116 were small enough so that a temperature of the inner surface 202 and a temperature of the outer surface 206 were substantially the same, then the heating element of the heater zone 204 would theoretically be at the same temperature as the outer surface 206. However, in practicality, there are one or more layers (e.g., polymeric layers, thermal gel or adhesive, etc.) between the heating element of the heater zone 204 and a metallic surface of a slat 116 or engine cowl 120; or in the case of non-metallic surface (e.g., a composite material) of the slat 116 or engine cowl 120, there may be multiple plies of dielectric material that significantly decrease the thermal conductivity between the heating elements and the outer surface 206 of the slat 116 or the outer surface of the engine cowl 120. This results in heating element temperatures that are higher than outer surface temperatures. For this reason, the third sensors 148 are thermally coupled to, or embedded in the slat 116 or engine cowl 120 in order to provide reliable data for the outer surface temperature of the slats 116 or engine cowls 120 at the locations of the third sensors 148. In some implementations, the third sensors 148 are thermally coupled to, or embedded in, the heater zones 204 of the heater 146, and calibration, additional calculations, or both are performed to determine the outer surface temperatures based on sensor data from the third sensors 148.

During a flight of the aircraft 100, the controller 142 utilizes the icing condition determiner 154 to determine if icing conditions are present. The icing condition determiner 154 calculates a value for water content of the outside air based on data received from the one or more second sensors 144, one or more flight condition values from the central computing system 126, or both. The value for water content is provided to the modeler 156. The icing condition determiner 154 uses flight condition values from the central computing system 126 (e.g., outside air temperature, altitude, and speed) and the value of water content to determine whether the aircraft 100 is presently experiencing an icing condition. When a determination by the icing conditions determiner 154 indicates that the aircraft 100 is not in an icing condition, the icing condition determiner 154 continues to determine if icing conditions are present based on input received from the central computing system 126 and the one or more second sensors 144.

When the determination by the icing condition determiner 154 indicates that the aircraft 100 is in an icing condition, the icing condition determiner 154 causes the modeler 156 to determine, for each heater zone 204 of each heater 146, a setpoint temperature for the heater zone 204 at the location of the third sensors 148 associated with the heater zone 204. The setpoint temperature is a temperature needed to prevent unacceptable icing on an outer surface of the aircraft 100 associated with the heater zone 204. In addition, after the determination indicates the presence of the icing condition, the icing condition determiner 154 continues to determine whether there is an icing condition based on input received from the central computing system 126 and the one or more second sensors 144 to identify an end of the icing condition and to update the value for the water content. When the end of the icing condition is detected, the controller 142 causes a stop to the provision of power to the heaters 146 after a particular period of time. During the period of time, the controller 142 maintains the setpoint temperatures determined before detection of the end of the icing condition.

In a particular implementation, the modeler 156 accesses a lookup table based on the water content of the outside air and at least a portion of the flight condition values to retrieve icing protection values. In some implementations, the icing protection values are determined based on wind tunnel testing and define a necessary amount of wing span, chord span, or both, that needs to be free of ice as well as an acceptable amount of allowable runback ice thickness to ensure sufficient aircraft performance in the icing condition. In an implementation, the icing protection values specify ice free regions and runback ice thickness values for outer surface areas of the aircraft 100 heated by the heaters 146. For the slats 116, the ice free regions can be specified as plus and minus wrap distances relative to a forwardmost position 208. The forwardmost position 208, which is also called the highlight, is the forwardmost point of the leading edge of the wing 106 at a neutral angle of attack. In FIG. 2, a positive wrap distance relative to the forwardmost position 208 of the slat 116 is a distance along an upper portion of the slat 116 from the forwardmost position 208 and a negative wrap distance relative to the forwardmost position 208 of the slat 116 is a distance along a lower portion of the slat 116 from the forwardmost position 208.

Ice protection requirements vary with flight phase, altitude, outside air temperature, flaps setting, and other flight values due to varying aerodynamic performance characteristics of the aircraft 100. As an example, the aircraft 100 requires a runback ice thickness less than 0.1 inches when the flaps 118 are stowed to meet maneuvering requirements at certain speeds or flight phases and requires a runback ice thickness up to 0.3 inches when the flaps 118 are deployed at other conditions.

For each heater 146, the modeler 156 determines first information including local pressure, droplet collection efficiencies, and heat transfer coefficients associated with an outer surface heated by the heater 146. In an implementation, particle trajectory analysis and flow analysis are performed by the modeler 156 using a numerical code. At each time step or each multiple of time steps, the modeler 156 calculates actual characteristics based on input values. In a particular implementation, the actual characteristics are calculated using LEWICE algorithms (software available from National Aeronautics and Space Administration (NASA) for use in the Unites States of America) or similar algorithms. The LEWICE algorithms perform trajectory calculations and pass determined values to a thermal model to determine the first information. In another implementation, the modeler 156 utilizes a neural network, or performs table lookups, based on the flight conditions and outside air water content to determine the first information. Utilizing the neural network, or performing table lookups, requires a database with values that envelope possible combinations of flight conditions and icing conditions to allow for accurate and appropriate output. Utilizing the neural network, or performing table lookups, based on the flight conditions and water content can result in faster determination of the first information as compared to calculating the first information.

The modeler 156 calculates temperature profiles for outer surfaces associated with heater zones 204 of the heaters 146 and calculates setpoint temperature for each location of a third sensor 148 utilizing the first information, the flight conditions, and the water content. In an implementation, the modeler 156 creates a 1-D mesh of each heater zone 204 to discretize a heated surface into nodes. A Messinger energy balance routine is used to determine, at each node, steady-state heat load due to convection, heat loads due to one or more phase changes of water (e.g., evaporation, condensation, sublimation, deposition, or combinations thereof), heat load due to kinetic energy from impingement, head load due to sensible heating of water running on the heated surface, and heat load due to conduction. Knowing the heat loads, the outer surface temperatures at the locations of the third sensors 148 are iteratively solved for until a convergence criterion is satisfied. In order to determine the surface temperature profile of the outer surface heated by a heater 146, values are provided for the heating power to each heater zone of the heater 146. The values are iterated upon in a separate iteration loop until the outer surface temperatures at the locations of the third sensors 148 converge on values that satisfy the icing protection values (i.e., ice free regions and run back ice thickness). The outer surface temperatures at the locations of the third sensors 148 that converge on values that satisfy the icing protection values are used as setpoint temperatures for the locations of the third sensors 148. The setpoint temperatures ensure that a temperature at a particular distance away from a location of a particular third sensor 148 at a coldest portion of the outer surface heated by the heater 146 is at least a first temperature that is above a freezing point of water (e.g., at a temperature of at least approximately 4 degrees Celsius).

The setpoint temperature for a location and the temperature determined from data received from the third sensor 148 for the location are provided to the control logic 158. In an implementation, the control logic 158 is implemented as a proportional-integral-derivative (PID) controller. In other implementations, the control logic 158 is implemented as another type of controller. For a particular heater zone 204 of a heater 146, the control logic 158 uses the setpoint temperature for the particular heater zone 204 and the temperature associated with the heater zone determined from the third sensor 148 to determine power (e.g., voltage) of AC electricity to send to the heater zone 204 to achieve the setpoint temperature at the location. The control logic 158 causes the heater zone 204 to receive the voltage calculated to achieve the setpoint temperature at the location of the third sensor 148.

Figure 3:
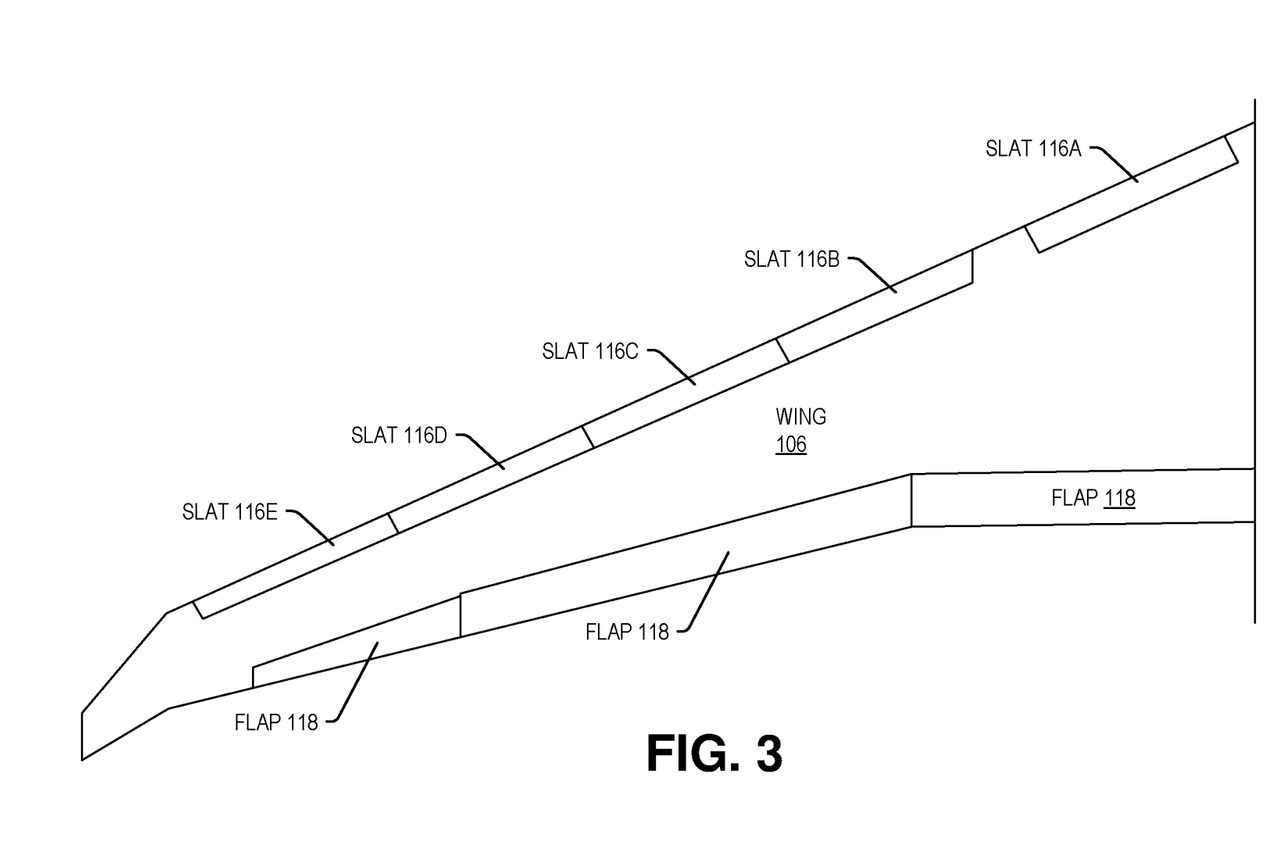
FIG. 3 is a top view representation of a wing of an aircraft.

FIG. 3 depicts a top view representation of an implementation of a wing 106 of an aircraft 100 that utilizes the ice protection system 102 of FIG. 1 to provide ice protection for selected slats 116 of the wing 106. In the example illustrated in FIG. 3, the wing 106 has five slats 116A-E and three flaps 118. The ice protection system 102 of FIG. 1 provides ice protection for slats 116A-C. In the implementation of FIG. 3, two heaters 146 are coupled to each of the slats 116A-C to heat lengths of the slats 116A-C, and each heater 146 is a multi-zone heater with three heater zones 204, such as the heater 146 depicted in FIG. 2. In other implementations, single zone heaters or combinations of single zone heaters and multi-zone heaters can be coupled to the slats 116A-C, and a different number of heaters 146 than two heaters 146 are coupled to one or more of the slats 146A-C. Wiring connects the heaters 146 to the controller 142. The wiring includes first wiring to provide data from the third sensors 148 to the controller 142. The wiring also includes second wiring to provide power from the controller 142 to heating elements of the heaters 146.

In a particular example of use of the ice protection system 102 of FIG. 1 for an aircraft 100 with a wing configuration as shown in FIG. 3, data from first sensors 132 is used by the central computing system 126 to determine that the aircraft 100 is in a descent flight phase with the flaps stowed, an altitude of 15000 ft, outside air temperature of −22 degrees Fahrenheit, an angle of attack of 2.2 degrees, and a Mach number of 0.47. In this example, data from the second sensors 144 is used by the controller 142 to determine that the liquid water content is 0.10 grams per cubic meter. The value for the liquid water content is consistent with the most severe continuous icing condition at a median volumetric droplet diameter of 25 microns.

Continuing the example above, based on the water content value and the flight condition values, the icing condition determiner 154 of the controller 142 determines that the aircraft 100 is in an icing condition. The modeler 156 accesses a lookup table based on the water content value and the flight condition values and determines that icing protection values for the slats 116B, 116C are an ice free wrap distance from the forwardmost position 208 of +9 inches and −4 inches with an allowable runback ice thickness of 0.2 inches, and that icing protection values for slat 116A are an ice free wrap distance from the forwardmost position 208 of +6 inches and −4 inches with an allowable runback ice thickness of 0.2 inches.

Figure 4:
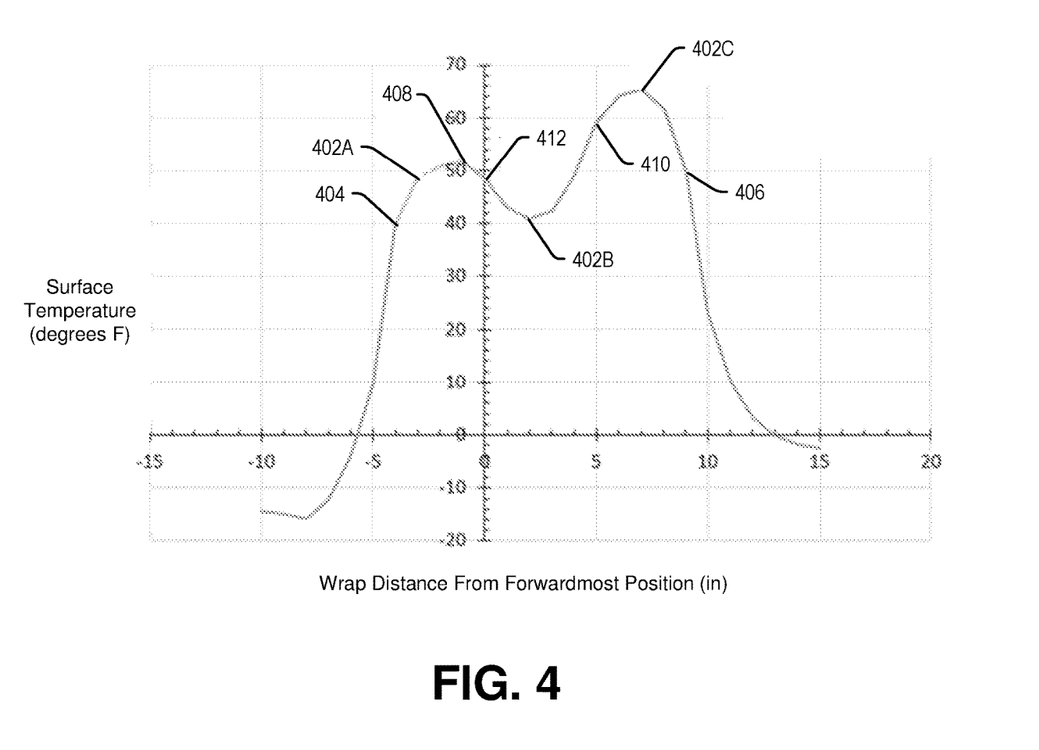
FIG. 4 is a graph depicting a temperature profile for an outer surface of a slat heated by a heater during an icing condition.

The modeler 156 of the controller 142 determines steady state temperature profiles for each of the heaters 146 using the assumptions that each heater zone 204 of a heater 146 has a constant power density and that the applied power is constant across a heater zone. FIG. 4 depicts the steady state temperature profile for the outer surface 206 of a portion of the slat 116C heated by a heater 146 based on the above conditions and ice protection values. The heaters 146 are multizone heaters with three heater zones per heater 146, such as the heater 146 depicted in FIG. 2.

In FIG. 4, locations 402 on the outer surface of the slat 116C correspond to locations of the third sensors 148. Location 402A is associated with a location corresponding to the third sensor 148 associated with the heater zone 204A, location 402B is associated with a location corresponding to the third sensor 148 associated with the heater zone 204B, and location 402C is associated with a location corresponding to the third sensor 148 associated with the heater zone 204C. Position 404 on the outer surface of the slat 116C corresponds to a location of an end of a first heater zone 204A of the heater 146 on a lower portion of the slat 116C and position 406 on the outer surface of the slat 116C corresponds to a location of an end of a third heater zone 204C of the heater 146 on an upper portion of the slat 116C. Position 408 corresponds to a location of an end of the first heater zone 204A of the heater 146 and a start of a second heater zone 204B of the heater 146. Position 410 corresponds to a location of an end of the second heater zone 204B of the heater 146 and a start of the third heater zone 204C of the heater 146. Position 412 of the outer surface corresponds to the forwardmost position 208 of the slat 116.

The temperature associated with locations 402A-C are setpoint temperatures and are provided to the control logic 158. The setpoint temperatures associated with locations 402A and 402C are higher than the setpoint temperature associated with location 402B to meet the ice protection values for runback ice thickness.

The temperatures at locations 402 from the temperature profile for each heater 146 and temperatures at the locations 402 determined from data from the third sensors 148 are used by the control logic 158 of the controller 142 to determine and send appropriate power to the heater zones 204 of the heater 146. The control logic 158 of controller 142 determines and sends appropriate power to each heater zone 204 of the heaters 146 coupled to slats 116A-C.

For example, based on the temperature profile of FIG. 4, the control logic 158 provides power that corresponds to 10.4 watts per square inch to the first heater zone 204A of the heater 146 coupled to the slat 116C to heat a lower portion of the slat 116, power that corresponds to 11.5 watts per square inch to the second heater zone 204B of the heater 146 that heats a middle portion of the slat 116C, and power that corresponds to 7.3 watts per square inch to the third heater zone 204C of the heater 146 that heats an upper portion of the slat 116C.

The ice protection system 102 continuously updates the voltages sent to the heaters 146 based on values for current flight conditions determined from data from the first sensors 132, the second sensors 144, and the third sensors 148. For the conditions of the example, the power demand of the ice protection system 102 to maintain the required ice protection is estimated to be 113 kilowatts for a typical duration of the icing condition. For a more typical icing condition, the liquid water content is about half of the water content of the example. For the more typical icing condition, the power demand of the ice protection system 102 to maintain the required ice protection is estimated to be 95 kilowatts for the typical duration of the icing condition.

Figure 5:
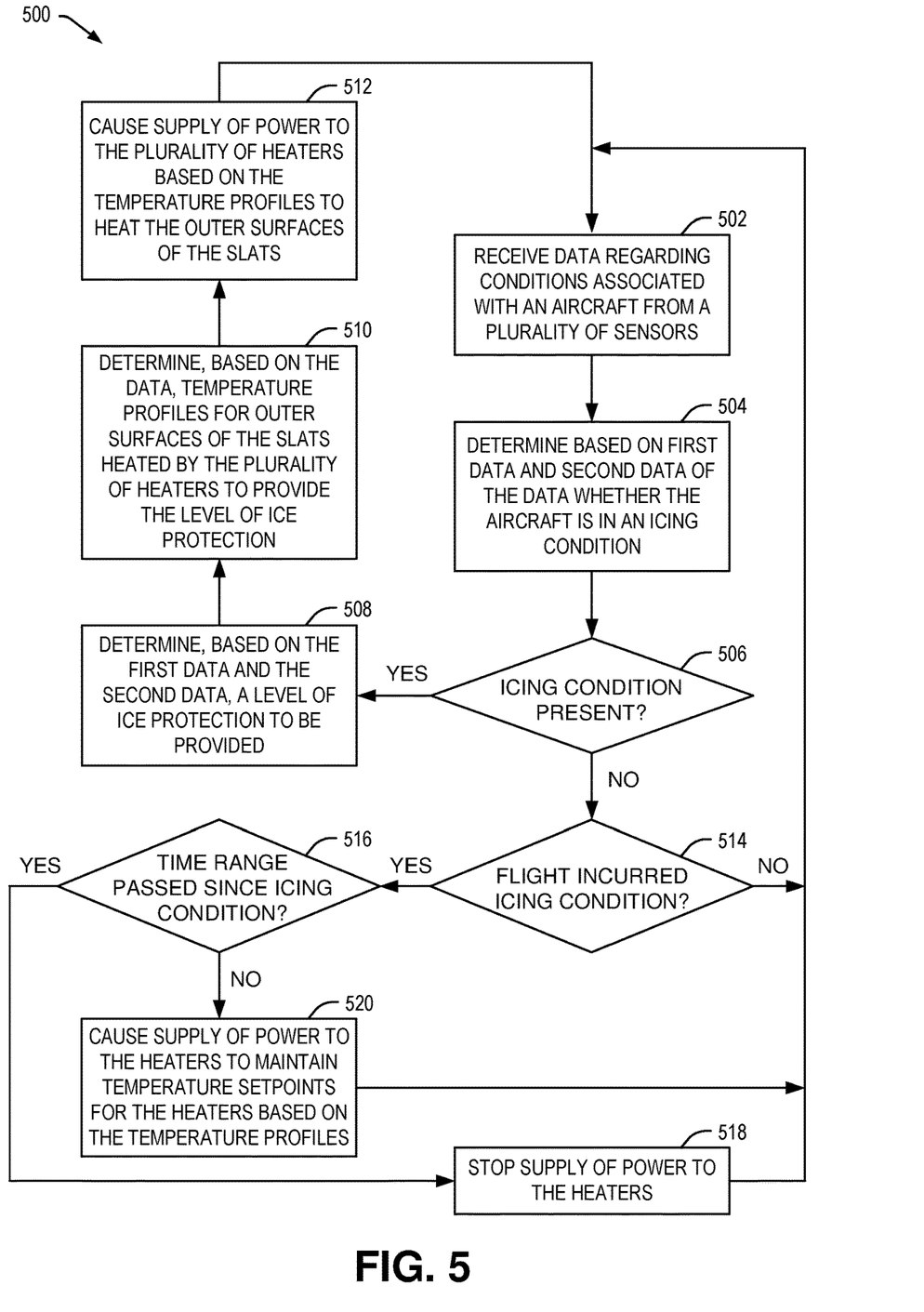
FIG. 5 is a flowchart of a method of providing ice protection during a flight of an aircraft.

FIG. 5 is a flow chart of a method 500 of providing ice protection during a flight of an aircraft 100. The method 500 is performed by the controller 142 of the ice protection system 102 of the aircraft 100. The method 500, at block 502, includes receiving, at the controller 142, data regarding conditions associated with the aircraft from a plurality of sensors. The plurality of sensors include first sensors 132 that provide first data regarding flight conditions, one or more second sensors 144 that provide second data regarding icing conditions, and third sensors 148 that provide data regarding temperatures associated with particular locations of outer surfaces of slats 116 heated by a plurality of heaters 146. When the ice protection system 102 is configured to provide icing protection to engine cowls 120, third sensors 148 coupled to the engine cowls 120 provide temperature data associated with temperatures of outer surfaces of the engine cowls 120 at particular locations corresponding to heater zones of heaters 146 coupled to the engine cowls 120. The controller 142 receives values for conditions associated with the aircraft determined from the data from the central computing system, by processing data received from the plurality of sensors 132, 144, 148, or by combinations thereof.

The method 500, at block 504, includes determining based on first data and second data of the data whether the aircraft is in an icing condition. The method 500, at decision block 506, proceeds to block 508 when an icing condition is present and determines, based on the first data and the second data a level of ice protection to be provided. In a particular implementation, the controller 142 determines the particular level of ice protection to be provided by accessing the level of ice protection based on one or more flight conditions, based on water content of outside air, or both, from a lookup table.

The method 500, continues to block 510 and the controller 142 determines, based on the data, temperature profiles for outer surface of the slats 116 heated by the plurality of heaters 146 to provide the level of ice protection. When the ice protection system 102 is configured to provide icing protection to the engine cowls 120, the controller determines temperature profiles for outer surfaces of the engine cowls heated by the plurality of heaters 146 to provide the level of ice protection.

The method 500, continues to block 512 and the controller causes supply of power to the plurality of heaters 146 based on the temperature profiles to heat the outer surfaces of the slats 116. When the ice protection system 102 is configured to provide icing protection to the engine cowls 120, power is also supplied to the heaters 146 coupled to the engine cowls 120 based on the temperature profiles of the outer surfaces of the engine cowls 120 to heat the outer surfaces of the engine cowls 120. The method 500 then returns to block 502.

The method 500, at decision block 506, proceeds to decision block 514 when there is no present icing condition. When a determination is made at decision block 514 that the flight of the aircraft 100 incurred an icing condition, the method proceeds to decision block 516. When a determination is made at decision block 516 that a time range (e.g., 3 minutes, 5 minutes, or some other time range) has passed since the aircraft 100 was in an icing condition, the method 500 proceeds to block 518 and the controller 142 stops supply of power to the heaters 146. The method 500 then returns to block 502. When a determination is made at decision block 516 that the time range has not passed, the method 500 proceeds to block 520 and the controller 142 causes supply of power to the heaters 146 to maintain temperature setpoints for the heaters 146 based on the temperature profiles last determined during the icing condition. The method 500, then returns to block 502. In other implementations, when the determination is made at decision block 516 that the time range has not passed, the same power is supplied to the heaters 146 as was last provided when the aircraft 100 was in the icing condition during the time range or a particular power is provided to the heaters 146 during the time range.

When the determination made at decision block 514 is that no icing condition has occurred during the flight of the aircraft 100, the method 500 returns to block 502.

Figure 6:
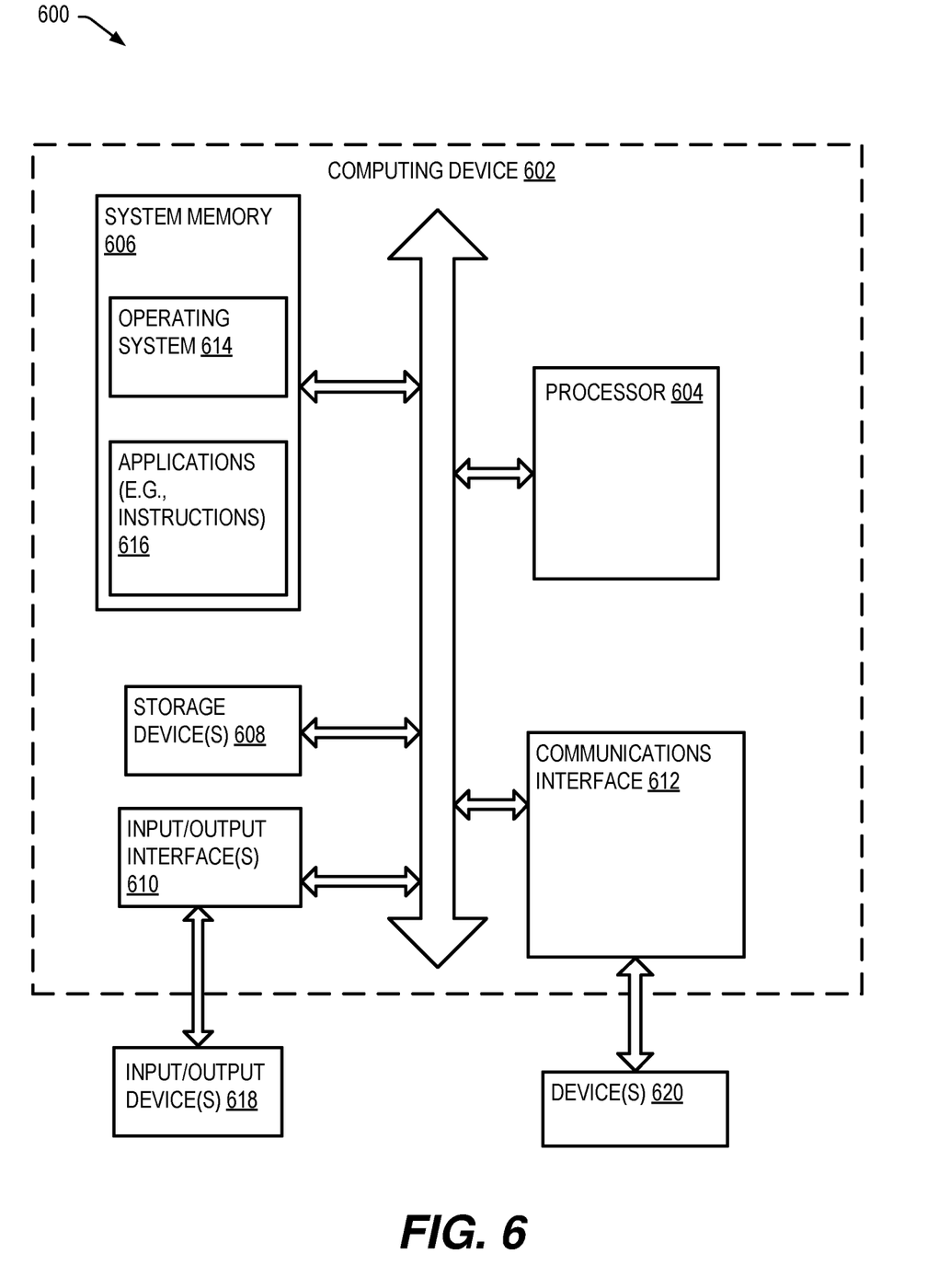
FIG. 6 is a diagram of a representation of a computer system that includes the controller of FIG. 1.

FIG. 6 is an illustration of a block diagram of a computing environment 600 including a general purpose computing device 602 configured to support implementations of computer-implemented methods and computer-executable program instructions (or code) according to the present disclosure. For example, the computing device 602, or portions thereof, may execute instructions to perform, or cause equipment to perform, operations described with reference to FIGS. 1-5. In an implementation, the computing device 602 is, or is a component of, the central computing system 126, the controller 142, or both.

The computing device 602 includes a processor 604. The processor 604 communicates with a system memory 606, one or more storage devices 608, one or more input/output interfaces 610, one or more communications interfaces 612, or a combination thereof. The system memory 606 includes non-transitory computer readable media, including volatile memory devices (e.g., random access memory (RAM) devices), nonvolatile memory devices (e.g., read-only memory (ROM) devices, programmable read-only memory, and flash memory), or both. The system memory 606 includes an operating system 614, which may include a basic input/output system for booting the computing device 602 as well as a full operating system to enable the computing device 602 to interact with users, other programs, and other devices. The system memory 606 includes one or more applications 616 (e.g., instructions) which are executable by the processor 604.

The processor 604 communicates with the one or more storage devices 608. For example, the one or more storage devices 608 are non-transitory computer readable media that can include nonvolatile storage devices, such as magnetic disks, optical disks, or flash memory devices. The storage devices 608 can include both removable and non-removable memory devices. The storage devices 608 can be configured to store an operating system, images of operating systems, applications, and program data. In particular implementations, the system memory 606, the storage devices 608, or both, include tangible computer-readable media incorporated in hardware and which are not signals.

The processor 604 communicates with the one or more input/output interfaces 610 that enable the computing device 602 to communicate with one or more input/output devices 618 to facilitate user interaction. The input/output interfaces 610 can include serial interfaces (e.g., universal serial bus (USB) interfaces or Institute of Electrical and Electronics Engineers (IEEE) 1364 interfaces), parallel interfaces, display adapters, audio adapters, and other interfaces. The input/output devices 618 can include keyboards, pointing devices, displays, speakers, microphones, touch screens, and other devices. The processor 604 detects interaction events based on user input received via the input/output interfaces 610. Additionally, the processor 604 sends a display to a display device via the input/output interfaces 610.

The processor 604 can communicate with one or more devices 620 via the one or more communications interfaces 612. The one or more devices 620 can include computing devices external to the aircraft 100 and controllers, sensors, and other devices of the aircraft 100. The one or more communications interfaces 612 may include wired Ethernet interfaces, IEEE 802 wireless interfaces, other wireless communication interfaces, one or more converters to convert analog signals to digital signals, electrical signals to optical signals, one or more converters to convert received optical signals to electrical signals, or other network interfaces.

Aspects of the disclosure are described further with reference to the following set of interrelated clauses:

According to Clause 1, an ice protection system for an aircraft includes: one or more heaters configured to be coupled to a surface of a wing of the aircraft; and a controller configured to, in response to a first determination indicating presence of an icing condition, determine a setpoint temperature for a first location of an outer surface of the wing configured to be heated by a heater of the one or more heaters and to control power provided to the heater based on the setpoint temperature, wherein the setpoint temperature for the first location is determined to cause a second location of the outer surface of the wing, which is heated by the heater and is located at a particular distance from the first location, to remain above a threshold temperature based on a projected temperature profile of the outer surface heated by the heater.

Clause 2 includes the ice protection system of Clause 1, wherein the projected temperature profile of the outer surface is based on data associated with the aircraft from a plurality of sensors, and wherein the projected temperature profile of the outer surface is determined to ensure that runback ice thickness remains below a threshold ice thickness.

Clause 3 includes the ice protection system of Clause 2, wherein the plurality of sensors comprise first sensors configured to provide first data regarding flight conditions, one or more second sensors configured to provide second data regarding icing conditions, and third sensors configured to provide third data regarding temperature of the outer surface of the wing at one or more particular locations of the outer surface.

Clause 4 includes the ice protection system of Clause 3, wherein the first determination of the presence of the icing condition is based on the second data.

Clause 5 includes the ice protection system of Clause 3, wherein the surface of the wing is an inner surface of a slat of the wing, and wherein the third sensors include a temperature sensor embedded in the slat near the first location.

Clause 6 includes the ice protection system of any of Clauses 1 to 5, wherein the heater comprises multiple heater zones, and wherein power supplied to each heater zone of the multiple heater zones is independently controllable by the controller based on a particular setpoint temperature for each heater zone determined from a particular projected temperature profile of the outer surface heated by the heater zone.

Clause 7 includes the ice protection system of any of Clauses 1 to 6, further including one or more second heaters coupled to an engine cowl, wherein the controller is configured to provide power to the one or more second heaters based on setpoint temperatures associated with second locations of an outer surface of the engine cowl, and wherein the setpoint temperatures associated with the second locations of the outer surface of the engine cowl are based on temperature data corresponding to the second locations received from third sensors.

Clause 8 includes the ice protection system of Clauses 1 to 7, wherein the controller is further configured to, in response to a second determination indicating a change from the icing condition to no icing condition, stop provision of power to the one or more heaters after a time range passes since the second determination, and wherein the setpoint temperature of the first location is maintained during the time range.

Clause 9 includes the ice protection system of any of Clauses 1 to 8, wherein the one or more heaters comprise one or more electro-thermal heaters, and wherein the one or more heaters include a first heater zone configured to heat an upper portion of an outer surface of a slat of the wing, a second heater zone configured to heat a middle portion of the outer surface of the slat, and a third heater zone configured to heat a lower portion of the outer surface of the slat.

Clause 10 includes the ice protection system of Clause 9, wherein the first heater zone, the second heater zone, and the third heater zone comprise separate electro-thermal heaters.

According to clause 11, a controller for an ice protection system of an aircraft includes: a processor; and a memory coupled to the processor, the memory comprising instructions executable by the processor to: receive data regarding conditions associated with the aircraft from a plurality of sensors; and in response to a determination based on the data indicating an icing condition: determine a setpoint temperature for a first location of an outer surface of a slat of a wing of the aircraft, wherein the first location is heated by a heater coupled to the slat; and control power provided to the heater based on the setpoint temperature, wherein the setpoint temperature for the first location is determined to cause a second location of the outer surface of the slat, which is heated by the heater and is located at a particular distance from the first location, to remain above a threshold temperature based on a projected temperature profile of the outer surface.

Clause 12 includes the controller of Clause 11, wherein the heater comprises a multiple heater element heating mat including a first heater zone configured to heat a lower portion of the slat, a second heater zone configured to heat a middle portion of the slat, and a third heater zone configured to heat an upper portion of the slat, and wherein the instructions are executable by the processor to independently control an amount of power supplied to each of the first heater zone, the second heater zone, and the third heater zone at a particular time.

Clause 13 includes the controller of Clause 11 or Clause 12, wherein the projected temperature profile is based on one or more first values determined from the data, and wherein the one or more first values include: local pressure, droplet collection efficiencies, heat load due to convection, heat load due to phase changes of water, heat load due to kinetic energy of droplet impingement, heat load due to sensible heating of water running on the outer surface, heat load due to conduction, or combinations thereof.

Clause 14 includes the controller of Clause 13, wherein one or more of the first values are determined using a neural network or a lookup table.

Clause 15 includes the controller of any of Clauses 11 to 14, wherein the data comprises first data from first sensors, wherein the first data enables determination of flight condition values, and wherein the flight condition values include one or more of a speed of the aircraft, an angle of attack, a flight phase, an altitude of the aircraft, an outside air temperature, or a flap setting.

Clause 16 includes the controller of any of Clauses 11 to 15, wherein the data comprises second data from one or more second sensors, and wherein the second data enables determination of a value for water content of outside air.

Clause 17 includes the controller of any of Clauses 11 to 16, wherein the setpoint temperature is determined by modeling a temperature profile of the outer surface of the slat heated by the heater.

According to Clause 18, a method of preventing unacceptable icing during flight of an aircraft including: receiving, at a controller, data regarding conditions associated with the aircraft from a plurality of sensors, wherein the plurality of sensors comprise first sensors configured to provide first data regarding flight conditions, one or more second sensors configured to provide second data regarding icing conditions, and third sensors configured to provide third data regarding temperatures associated with particular locations of outer surfaces of slats heated by a plurality of heaters; and in response to a determination based on the first data and the second data indicating an icing condition: determining, at the controller based on the first data and the second data, a level of ice protection to be provided; determining, at the controller based on the data, temperature profiles for outer surfaces of the slats heated by the plurality of heaters to provide the level of ice protection; and causing, via the controller, supply of power to the plurality of heaters based on the temperature profiles to heat the outer surfaces of the slats.

Clause 19 includes the method of claim 18 further including, in response to the determination indicating the icing condition, causing, via the controller, second power to be supplied to a second plurality of heating elements coupled to surfaces of engine cowls, wherein the second power is determined based on second temperature profiles of outer surfaces of the engine cowls determined based on the data, wherein the third data of the data includes temperature data from third sensors coupled to the engine cowls, and wherein the third sensors coupled to the engine cowls provide the controller with temperature data associated with particular locations of the outer surfaces of the engine cowls heated by the second plurality of heating elements.

Clause 20 includes the method of Clause 18 or Clause 19, further including adjusting the supply of power based on one or more changes in the data received from the sensors.

The illustrations of the examples described herein are intended to provide a general understanding of the structure of the various implementations. The illustrations are not to scale and are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An ice protection system for an aircraft, the ice protection system comprising:
   one or more heaters configured to be coupled to a surface of a slat of a wing of the aircraft; and
   a controller coupled to the one or more heaters and coupled to a plurality of sensors that provide sensor data regarding conditions associated with the aircraft to the controller, wherein the controller is configured to, in response to a first determination by the controller based on the sensor data indicating presence of an icing condition, determine a setpoint temperature for a first location of an outer surface of the slat configured to be heated by a heater of the one or more heaters and to control power provided to the heater based on the setpoint temperature and the sensor data, wherein the setpoint temperature for the first location is determined to cause a second location of the outer surface of the slat, which is heated by the heater and is located at a particular distance from the first location, to remain above a threshold temperature based on a projected temperature profile of the outer surface heated by the heater.

2. The ice protection system of claim 1, wherein the projected temperature profile of the outer surface is based on data associated with the aircraft from a plurality of sensors, and wherein the projected temperature profile of the outer surface is determined to ensure that runback ice thickness remains below a threshold ice thickness.

3. The ice protection system of claim 2, wherein the plurality of sensors comprise first sensors configured to provide first data regarding flight conditions, one or more second sensors configured to provide second data regarding icing conditions, and third sensors configured to provide third data regarding temperature of the outer surface of the slat at one or more particular locations of the outer surface.

4. The ice protection system of claim 3, wherein the first determination of the presence of the icing condition is based on the second data.

5. The ice protection system of claim 3, wherein the surface of the slat is an inner surface of the slat, and wherein the third sensors include a temperature sensor embedded in the slat near the first location.

6. The ice protection system of claim 1, wherein the heater comprises multiple heater zones, and wherein power supplied to each heater zone of the multiple heater zones is independently controllable by the controller based on a particular setpoint temperature for each heater zone determined from a particular projected temperature profile of the outer surface heated by the heater zone.

7. The ice protection system of claim 1, further comprising one or more second heaters coupled to an engine cowl, wherein the controller is configured to provide power to the one or more second heaters based on setpoint temperatures associated with second locations of outer surfaces of the engine cowl, and wherein the setpoint temperatures associated with the second locations of outer surfaces of the engine cowl are based on temperature data corresponding to the second locations received from third sensors.

8. The ice protection system of claim 1, wherein the controller is further configured to, in response to a second determination indicating a change from the icing condition to no icing condition, stop provision of power to the one or more heaters after a time range passes since the second determination, and wherein the setpoint temperature of the first location is maintained during the time range.

9. The ice protection system of claim 1, wherein the one or more heaters comprise one or more electro-thermal heaters, and wherein the one or more heaters include a first heater zone configured to heat an upper portion of an outer surface of the slat, a second heater zone configured to heat a middle portion of the outer surface of the slat, and a third heater zone configured to heat a lower portion of the outer surface of the slat.

10. The ice protection system of claim 9, wherein the first heater zone, the second heater zone, and the third heater zone comprise separate electro-thermal heaters.

11. A controller for an ice protection system of an aircraft, the controller comprising:
   a processor configured to execute instructions to:
      receive data regarding conditions associated with the aircraft from a plurality of sensors; and
      in response to a determination based on the data indicating an icing condition:

determine a setpoint temperature for a first location of an outer surface of a slat of a wing of the aircraft, wherein the first location is heated by a heater coupled to the slat; and control power provided to the heater based on the setpoint temperature, wherein the setpoint temperature for the first location is determined to cause a second location of the outer surface of the slat, which is heated by the heater and is located at a particular distance from the first location, to remain above a threshold temperature based on a projected temperature profile of the outer surface.

12. The controller of claim 11, wherein the heater comprises a multiple heater element heating mat including a first heater zone configured to heat a lower portion of the slat, a second heater zone configured to heat a middle portion of the slat, and a third heater zone configured to heat an upper portion of the slat, and wherein the instructions are executable by the processor to independently control an amount of power supplied to each of the first heater zone, the second heater zone, and the third heater zone at a particular time.

13. The controller of claim 11, wherein the projected temperature profile is based on one or more first values determined from the data, and wherein the one or more first values include: local pressure, droplet collection efficiencies, heat load due to convection, heat load due to phase changes of water, heat load due to kinetic energy of droplet impingement, heat load due to sensible heating of water running on the outer surface, heat load due to conduction, or combinations thereof.

14. The controller of claim 13, wherein one or more of the first values are determined using a neural network or a lookup table.

15. The controller of claim 11, wherein the data comprises first data from first sensors, wherein the first data enables determination of flight condition values, and wherein the flight condition values include one or more of a speed of the aircraft, an angle of attack, a flight phase, an altitude of the aircraft, an outside air temperature, or a flap setting.

16. The controller of claim 11, wherein the data comprises second data from one or more second sensors, and wherein the second data enables determination of a value for water content of outside air.

17. The controller of claim 11, wherein the plurality of sensors comprise first sensors configured to provide first data regarding flight conditions, one or more second sensors configured to provide second data regarding icing conditions, and third sensors configured to provide third data regarding temperatures associated with particular locations of outer surfaces of slats heated by a plurality of heaters.

18. A method of preventing unacceptable icing during flight of an aircraft, the method comprising:

receiving, at a controller, data regarding conditions associated with the aircraft from a plurality of sensors; and in response to a determination based on the data indicating an icing condition:

determining, at the controller based on the data, a setpoint temperature for a first location of an outer surface of a slat of a wing of the aircraft, wherein the first location is configured to be heated by a heater of a plurality of heaters, and wherein the setpoint temperature for the first location is determined to cause a second location of the outer surface of the slat, which is heated by the heater and is located at a particular distance from the first location, to remain above a threshold temperature based on a projected temperature profile of the outer surface heated by the heater; and controlling, via the controller, power supplied to the heater based on the setpoint temperature and the data.

19. The method of claim 18, further comprising, in response to the determination indicating the icing condition, causing, via the controller, second power to be supplied to a second plurality of heating elements coupled to surfaces of engine cowls, wherein the second power is determined based on second temperature profiles of outer surfaces of the engine cowls determined based on the data, wherein the data includes temperature data from third sensors coupled to the engine cowls, and wherein the third sensors coupled to the engine cowls provide the controller with temperature data associated with particular locations of the outer surfaces of the engine cowls heated by the second plurality of heating elements.

20. The method of claim 18, further comprising adjusting the supply of power based on one or more changes in the data received from the plurality of sensors.

* * * * *